United States Patent Office 3,202,639
Patented Aug. 24, 1965

3,202,639
PROCESS FOR THE PRODUCTION OF POLYMERS CONTAINING C-H ACID GROUPS
Josef Witte, Cologne-Stammheim, Germany, assignor to Farbenfabriken Bayer Aktiengesellschaft, Leverkusen, Germany, a German corporation
No Drawing. Filed July 22, 1960, Ser. No. 44,560
Claims priority, application Germany, Aug. 1, 1959, F 29,081
12 Claims. (Cl. 260—79.3)

The present invention relates to polymers containing C-H acid groups more particularly to copolymers from acrylonitrile which contain C-H acid groups and is further concerned with processes for the production of these polymers.

Acid polymers may be prepared by the polymerization of monomers containing carboxyl or sulphonic acid groups and also by subsequently introducing acid groups into the polymer.

Polymers with acid properties are used industrially as ion exchangers, soil-improving agents, wetting agents and dispersing agents, etc. Copolymers with a relatively low proportion of acid groups and a high content of, for example, acrylonitrile can be processed into shaped articles such as filaments, fibres, foils, films, etc. which can be satisfactorily dyed.

It is an object of the present invention to provide acid polymers, more particularly polymers containing C-H acid groups. A further object is to provide copolymers from acrylonitrile which contain C-H acid groups and show a remarkable dyeing capacity especially with basic dyestuffs. A further object is to provide a process for the production of polymers which contain C-H acid groups which process can easily be carried out and leads to high yields. Still further objects will become apparent hereinafter.

It has now been found that polymers with strongly acid properties are surprisingly obtained in a very easy manner by polymerising an unsaturated compound which carries a hydrogen atom and three acidifying substituents on a carbon atom which will be designated as $C_a$. One, two or all three of these substituents may contain a sulphone, sulphonic acid or carboxylic acid ester group directly attached to the carbon atom $C_a$. One or two of the aforementioned substituents may be a nitrile group. It is, however essenital for at least one substituent to contain a polymerisable olefinic double bond. The aforementioned unsaturated compounds may be polymerised either alone or in admixture with one or more other vinyl compounds.

Compounds of the aforementioned type are hereinafter briefly referred to as unsaturated C-H acid compounds.

Preferred unsaturated C-H acid compounds for employment in the process according to the present invention are those of the general formula

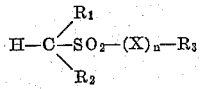

in which $R_1$ and $R_2$ each represent a nitrile, alkyl sulphonyl, aryl sulphonyl, aralkyl sulphonyl or cycloalkyl sulphonyl group, $R_3$ represents a vinyl, acryloxy, acrylamido or methacrylamido radical, X represents an alkylene radical, such as ethylene or an arylene radical, such as phenylene and $n$ is 0 or 1.

Particularly suitable unsaturated C-H acid compounds for employment in the process according to the present invention are p-methacrylaminophenyl-sulphonyl-methyl sulphonyl-cyanomethane (I), p-vinylphenyl-sulphonyl-methylsulphonyl-cyanomethane (II), m-methacrylaminophenyl-sulphonyl-dicyanomethane (III), p-methacrylaminophenyl-sulphonyl-dimethylsulphonyl-methane (IV), p-methacrylaminophenyl-sulphonyl-methylsulphonyl-acetic acid methyl ester (V), p-methacrylaminophenyl-sulphonyl-methylsulphonyl-methane-sulphonic acid methyl ester (VI), dimethylsulphonyl-vinyl-sulphonyl-methane (VII) and phenylsulphonyl-p-methacrylaminophenylsulphonyl-cyanomethane (VIII).

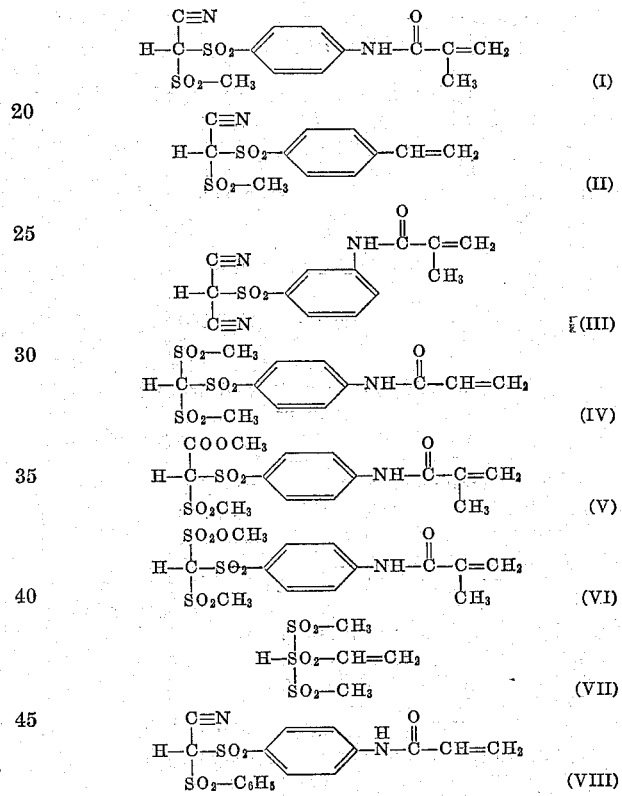

Those unsaturated C-H acid compounds which carry at least two sulphone groups as acidifying substituents are particularly suitable for employment in the process according to the present invention.

The C-H acid polymerisable compounds which are employed in the process according to the present invention can be prepared by the conventional methods of organic chemistry. They can, for example, be prepared by reacting an acylating agent, for example a sulphonic acid chloride, with a compound containing an active methylene group, for example, a methylene disulphone, cyanomethylene sulphone or malonic acid dinitrile. One of the reactants must contain a polymerisable vinyl grouping or a functional group which enables a polymerisable vinyl group to be subsequently introduced. The synthesis of p-methacrylaminophenyl sulphonyl-methylsulphonyl-cyanomethane and methacrylamino-phenylsulphonyl-dicyanomethane will hereinafter be explained by reference to two formula diagrams.

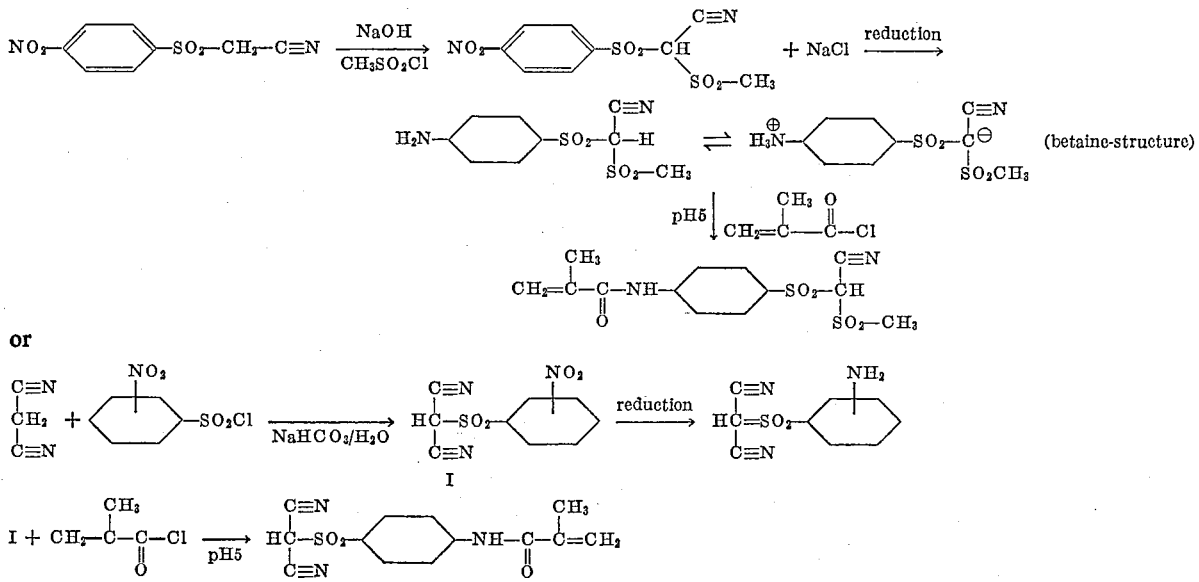

or

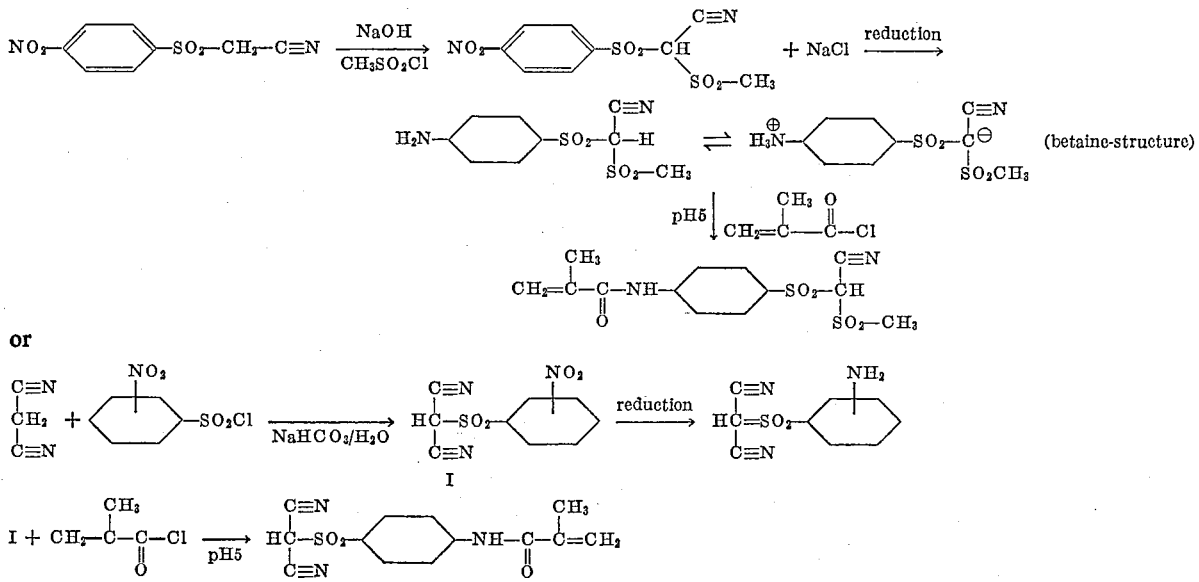

The first synthesis is more fully described hereinafter in Example 1. As regards the second synthesis, malonic acid dinitrile is initially reacted with nitrobenzene sulphochloride in aqueous medium in the presence of bicarbonate to produce nitrobenzene sulphonyl dicyanomethane. This is transformed by reduction into the corresponding amino compound, from which the desired final product is obtained by reaction with methacryl chloride.

Suitable vinyl compounds for copolymerisation with the unsaturated C-H acid compounds are styrene, substituted styrenes, divinyl benzene, acrylonitrile, methacrylonitrile, acrylic acid, acrylic and methacrylic acid esters, vinyl chloride, vinylidene chloride, vinyl esters, butadiene, isoprene, β-chlorobutadiene, alkyl vinyl ethers and other olefinically unsaturated polymerisable compounds. Copolymers of the unsaturated C-H acid compounds with acrylonitrile can be used in the textile field.

The polymerisation of the unsaturated C-H acid compounds or the copolymerisation of the unsaturated C-H acid compounds with at least one additional vinyl compound may be carried out by any known method in block, solution, emulsion or dispersion. The method used for the polymerisation is not critical. By copolymers are also meant polymers which contain different unsaturated C-H acid compounds.

Catalysts which are normally employed in the polymerisation of vinyl monomers and which easily split up into radicals may be employed in the process according to the present invention. Suitable catalysts are diacyl peroxides, dialkyl peroxides, hydrogen peroxide, alkyl hydroperoxides, acyl hydroperoxides and azo compounds, such as azo diisobutyric acid nitrile. A preferred catalyst when the polymerisation is carried out in aqueous medium, especially for the copolymerisation of the unsaturated C-H acid compounds with acrylonitrile, is the redox system, persulphate, and sulphur compounds of low oxidation states, such as sulphites, bisulphites and pyrosulphites, as well as thiosulphates, at pH values below 7, although other redox systems may be employed as catalysts, if necessary in the presence of small quantities of heavy metal ions, such as iron and copper ions. The radical-forming catalysts are added in the usual quantities, that is to say in an amount of from 0.1 to 5% by weight, based on the weight of the monomers.

The unsaturated C-H acid compounds may be employed as such or in the form of their salts. The polymerisation proceeds extremely smoothly and with high yields.

Copolymers with acrylonitrile and if necessary a third vinyl compound which can be copolymerised with acrylonitrile such as for example with acrylic esters and a small proportion for example from 0.1 to 5.0%, of the unsaturated C-H acid compounds, can be processed to form valuable shaped articles, such as for example filaments, fibres and foils, which are characterised by good dyeing capacity, especially with basic dyestuffs. The shaped articles produced from such copolymers surprisingly have extraordinary thermostability. Only slight discolouration of the shaped articles occurs even on heating for a relatively long time to temperatures of from 160 to 170° C. Furthermore, the dyed material shows extremely clear, brilliant tones, so that it must be concluded that the unsaturated C-H acid compounds have a suprisingly good compatibility with polyacrylonitrile. By comparison with the known acrylonitrile polymers containing carboxyl groups, the polymers produced by the process according to the present invention possess the advantage of greater thermostability. In contrast to copolymers of acrylonitrile with small quantities of unsaturated sulphonic acids, the polymers produced by the process according to the present invention do not become gelatinous on being heated to relatively high temperatures in the solvents, for example dimethyl formamide, which are essential for the production of filaments.

The present invention is further disclosed in the following examples which are illustrative but not limitative thereof.

*Example 1*

50 parts by weight of p - methacrylaminophenyl - sulphonyl - methyl sulphonyl - cyanomethane are introduced into a vessel which has been freed from oxygen by flushing it with nitrogen. The p - methacrylaminophenylsulphonyl - methyl sulphonyl - cyanomethane is neutralised with dilute sodium hydroxide solution and diluted with 250 parts by weight of water. The solution is adjusted to a pH value of 5 with sulphuric acid, 0.25 part by weight of potassium persulphate and 1 part by weight of sodium pyrosulphite are added to the solution and the mixture is then heated for 10 hours at 50° C. During this time, a viscous solution is formed, from which a polymer which swells strongly in water is precipitated after adding hydrochloric acid.

31 parts by weight of p-nitrobenzene sulphoacetonitrile are dissolved in dilute sodium hydroxide solution. 17.0 parts by weight of methane sulphochloride are slowly added while cooling with ice and stirring vigorously. During the reaction, the pH value is kept at 8–9 by adding dilute sodium hydroxide solution. After completing the addition of the sulphochloride, stirring is continued for 30 minutes and then the mixture is slowly acidified with hydrochloric acid while cooling. The crystal mass which forms is dissolved in sodium carbonate solution, filtered and precipitated with hydrochloric acid, filtered with suction and dried. The yield is 40 parts by weight of p-nitrobenzene sulphonylmethyl sulphonyl-cyanomethane, that is to say, 9.6% of the theoretical; melting point 165° C.

15 parts by weight of p-nitrobenzene sulphonylmethyl-sulphonylcyanomethane are dissolved in 30 parts by volume of water at 30–35° C. and a solution of 35 parts by weight of tin-II-chloride in 30 parts by volume of water, acidified with hydrochloric acid, is added. The temperature is maintained during the reduction at 50–70° C. by occasional cooling. Crystals of the amino compound immediately start to separate out. The crystals are cooled with iced water and then suction filtered. The crystals on the suction filter are first of all washed with iced water and then with cold methanol and dried. The yield is 11 parts by weight. The colourless crystals melt at 230–235° C. with decomposition.

9.2 parts by weight of p-aminobenzene sulphonyl-methylsulphonylcyanomethane are dissolved in sodium hydroxide solution and 4 parts by weight of methyacrylic acid chloride are added dropwise while cooling with iced water and stirring vigorously. The pH value is maintained at 5 during the acylation by adding sodium acetate. When the reaction is complete the reaction mixture is acidified with 20% sulphuric acid. The crystals which form are suction-filtered, washed with water and dried. The yield is 11 parts by weight. The colourless crystals melt at 199–200° C.

*Example 2*

280 parts by weight of water, 18.0 parts by weight of acrylonitrile and 2.0 parts by weight of p-methacroyl-aminophenyl sulphonylmethyl sulphonyl cyanomethane are introduced into a vessel which has been flushed with nitrogen. The pH of the mixture is adjusted to from 2.5 to 3 with sulphuric acid. 0.5 part by weight of potassium persulphate and 1.2 parts by weight of sodium pyrosulphite are then added. The mixture is heated to 50° C., while stirring and passing nitrogen therethrough. The polymerisation is stopped after three hours and the precipitated polymer is filtered off with suction. After drying, 19.0 parts by weight of a pure white finely divided powder are obtained.

*Example 3*

280 parts by weight of water, 18 parts by weight of acrylonitrile, 1 part by weight of acrylmethacrylate and 1 part by weight of p-methacrylamino phenylsulphonyl-methylsulphonyl-cyanomethane are introduced into a vessel which has been flushed with nitrogen. The pH of the mixture is adjusted to from 3 to 3.5 with phosphoric acid and 1 part by weight of potassium persulphate and 2 parts by weight of sodium pyrosulphite are added. Polymerisation is continued for 10 hours at 40° C. and 19 parts by weight of a pure white finely divided polymer are isolated.

*Example 4*

280 parts by weight of water, 18.0 parts by weight of acrylonitrile and 2 parts weight of p-methacrylamino-phenylsulphonyl-dicyanomethane are placed in a vessel which has been flushed with nitrogen and the pH value is adjusted to from 2.5 to 3 with sulphuric acid. 0.5 part by weight of potassium persulphate and 1.2 parts by weight of sodium pyrosulphite are then added. The mixture is heated to 50° C. while stirring and passing nitrogen therethrough. The polymerisation is stopped after three hours and the precipitated polymer is filtered off with suction. There are thus obtained 19 parts by weight of a pure white finely divided polymer.

*Example 5*

280 parts by weight of water, 18 parts by weight of acrylonitrile, 1 part by weight of acrylic acid methyl ester and 1 part of p-methacrylaminophenyl-sulphonyl-dicyanomethane are introduced into a vessel which has been flushed with nitrogen. The pH of the mixture is adjusted to from 3 to 3.5 with phosphoric acid and 1 part by weight of potassium persulphate and 2 parts by weight of sodium pyrosulphite are added. Polymerisation takes place for 10 hours at 40° C. and 20 parts by weight of a pure white finely divided polymer are obtained.

In contrast to polymers prepared in the same manner but without the addition of C–H acid compounds, the copolymers obtained as described in Examples 2, 3, 4 and 5 show a substantially better dyeing capacity with basic dyestuffs and a substantially lesser degree of discolouration on heating to 160° C. The judging of the polymers was carried out with films which were cast from a 10% solution of the polymer in dimethyl formamide and which were thereafter dried for 12 hours at 50° C. For testing the thermostability, the films were heated at 160° C. for three hours in the presence of oxygen. The dyeing capacity was tested with a dyestuff, such as that obtained according to Examples 1 and 2 of French patent specification No. 1,158,839.

I claim:
1. As a new composition of matter, a polymer containing C-H acid groups which is prepared by the polymerization of a compound of the general formula:

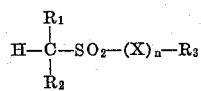

wherein $R_1$ and $R_2$ each represent a member selected from the group consisting of nitrile, alkyl sulfonyl, aryl sulfonyl, aralkyl sulfonyl, and cycloalkyl sulfonyl, $R_3$ represents a member selected from the group consisting of vinyl, acryloxy, acrylamido, and methacrylamido, X is selected from the group consisting of alkylene and arylene, and $n$ is 0 or 1, said polymerization being conducted in the presence of a free radical-forming catalyst which is present in an amount of 0.1–5% by weight based on the monomer weight.

2. The polymer of claim 1 prepared by the polymerization of p-methacrylaminophenyl-sulfonyl-methyl sulfonyl-cyanomethane.

3. The polymer of claim 1 prepared by the polymerization of methacrylaminophenyl-sulfonyl-dicyanomethane.

4. As a new composition of matter, a polymer containing C-H acid groups, which polymer is a copolymer (1) an unsaturated compound of the general formula:

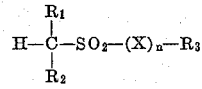

wherein $R_1$ and $R_2$ each represent a member selected from the group consisting of nitrile, alkyl sulfonyl, aryl sulfonyl, aralkyl sulfonyl, and cycloalkyl sulfonyl, $R_3$ represents a member selected from the group consisting of vinyl, acryloxy, acrylamido, and methacrylamido, X is selected from the group consisting of alkylene and arylene, and $n$ is 0 or 1, and (2) a copolymerizable vinyl monomer.

5. The polymer of claim 4 wherein at least two of the acidifying substituents in monomer (1) are sulfone groups.

6. The polymer of claim 4 wherein said vinyl monomer is acrylonitrile.

7. The polymer of claim 4 wherein said copolymerizable vinyl monomer is selected from the group consisting of monomers containing a vinyl group, monomers containing an acrylyl group, and diolefins.

8. As a new composition of matter, a copolymer of a major amount by weight of p-aminobenzene sulfonyl-methyl-sulfonyl-cyanomethane and a minor amount by weight of methacrylic acid chloride, said copolymer containing C-H acid groups.

9. As a new composition of matter, a coploymer of a major amount by weight of acrylonitrile and a minor amount by weight of p-methacrylaminophenyl sulfonyl-methyl sulfonyl cyanomethane, said copolymer containing C-H acid groups.

10. As a new composition of matter, a copolymer of a major amount by weight of acrylonitrile and minor amounts by weight of acrylmethacrylate and p-methacrylaminophenyl-sulfonyl methyl sulfonyl-cyanomethane, said copolymer containing C-H acid groups.

11. As a new composition of matter, a copolymer of a major amount by weight of acrylonitrile and a minor amount by weight of p-methacrylaminophenyl sulfonyl-dicyanomethane, said copolymer containing C-H acid groups.

12. As a new composition of matter, a copolymer of a major amount by weight of acrylonitrile and a minor amount by weight of methyl acrylate and p-methacrylaminophenyl - sulfonyldicyanomethane, said copolymer containing C-H acid groups.

References Cited by the Examiner
UNITED STATES PATENTS

| | | | |
|---|---|---|---|
| 2,595,779 | 5/52 | Dudley | 260—2.2 |
| 2,678,333 | 5/54 | Hartough et al. | 260—503 |
| 2,803,615 | 8/57 | Ahlbrecht et al. | 260—79.3 |
| 2,811,513 | 10/57 | Hill | 260—79.3 |
| 2,888,441 | 5/59 | Morris | 260—2.2 |

OTHER REFERENCES

Hackh's Chemical Dictionary, 3rd edition, McGraw-Hill, New York (1944).

JOSEPH L. SCHOFER, *Primary Examiner*.

PHILIP E. MANGAN, HAROLD N. BURSTEIN, WILLIAM H. SHORT, *Examiners*.